United States Patent
Rapolu et al.

(10) Patent No.: US 12,111,897 B2
(45) Date of Patent: Oct. 8, 2024

(54) METHOD AND SYSTEM FOR PROCESSING ACTION DATA

(71) Applicant: Visa International Service Association, San Francisco, CA (US)

(72) Inventors: Sushma Rapolu, San Rafael, CA (US); Anup Tripathi, San Mateo, CA (US); Ibrahim Kusumah Kusnanto, Singapore (SG); Jonathan Twichell, Cedar Park, TX (US)

(73) Assignee: Visa International Service Association, San Francisco, CA (US)

(*) Notice: Subject to any disclaimer, the term of this patent is extended or adjusted under 35 U.S.C. 154(b) by 0 days.

(21) Appl. No.: 18/569,015

(22) PCT Filed: Jun. 21, 2022

(86) PCT No.: PCT/US2022/034393
§ 371 (c)(1),
(2) Date: Dec. 11, 2023

(87) PCT Pub. No.: WO2022/271738
PCT Pub. Date: Dec. 29, 2022

(65) Prior Publication Data
US 2024/0265076 A1 Aug. 8, 2024

Related U.S. Application Data (60) Provisional application No. 63/213,397, filed on Jun. 22, 2021.

(51) Int. Cl.
*G06F 21/31* (2013.01)

(52) U.S. Cl.
CPC .................. *G06F 21/31* (2013.01)

(58) Field of Classification Search
None
See application file for complete search history.

(56) References Cited

U.S. PATENT DOCUMENTS 9,917,694 B1* 3/2018 Juels .............. H04L 9/0861
9,996,835 B2* 6/2018 Dill ................ H04L 9/32
(Continued)

OTHER PUBLICATIONS

Amalanathan Thushanthan; Access delegation via OAuth 2.0; Apr. 7, 2019; accessed from: https://medium.com/identity-beyond-borders/oauth-2-0-a436a0bfbcf2 (Year: 2019).*

(Continued)

*Primary Examiner* — James R Turchen
(74) *Attorney, Agent, or Firm* — Kilpatrick Townsend & Stockton LLP (57) ABSTRACT

A method is disclosed and includes receiving a token request message comprising a real credential or a reference to the real credential, a unique value, and action data from a token requestor, and obtaining a token. The method also includes transmitting the token to the token requestor, and providing the unique value and the action data to a data matching computer. The data matching computer stores the unique value and the action data. The data matching computer subsequently receives a message from a data processing computer comprising the unique value, determines that the received unique value matches the stored unique value, and provides the action data to the data processing computer or performs an action with respect to the action data.

20 Claims, 8 Drawing Sheets

(56) References Cited

U.S. PATENT DOCUMENTS

| | | | |
|---|---|---|---|
| 11,005,853 | B1 | 5/2021 | Agarwal et al. |
| 11,494,765 | B2* | 11/2022 | Tadiparti .......... G06Q 20/38215 |
| 2015/0112870 | A1 | 4/2015 | Nagasundaram et al. |
| 2015/0127547 | A1 | 5/2015 | Powell et al. |
| 2015/0220917 | A1 | 8/2015 | Aabye et al. |
| 2016/0094991 | A1 | 3/2016 | Powell et al. |
| 2017/0262841 | A1* | 9/2017 | Good .................. G06Q 20/385 |
| 2017/0300906 | A1* | 10/2017 | Shanmugam ........ G06Q 20/405 |
| 2017/0323297 | A1* | 11/2017 | Shanmugam ........ G06Q 20/223 |
| 2018/0048640 | A1 | 2/2018 | Johansson et al. |
| 2018/0211055 | A1 | 7/2018 | Balijepalli et al. |
| 2018/0285871 | A1* | 10/2018 | Long .................. G06Q 20/405 |
| 2020/0021441 | A1 | 1/2020 | Le Saint et al. |
| 2020/0111081 | A1 | 4/2020 | Kallugudde |
| 2020/0302086 | A1* | 9/2020 | Post ..................... H04L 9/3213 |
| 2021/0119990 | A1 | 4/2021 | Law et al. |

OTHER PUBLICATIONS

PCT/US2022/034393, "International Search Report and Written Opinion", Oct. 17, 2022, 9 pages.
IBM Documentation, "Nonce, a Randomly Generated Token", 2022, 1 page.
Apple Developer Documentation, "Verifying a User", 3 pages.
EP22829178.7, "Extended European Search Report", Jun. 28, 2024, 11 pages.

* cited by examiner

METHOD AND SYSTEM FOR PROCESSING ACTION DATA

CROSS-REFERENCES TO RELATED APPLICATIONS

This application is a National Stage of International Application No. PCT/US2022/034393, filed on Jun. 21, 2022, which claims priority to U.S. provisional patent application No. 63/213,397, filed on Jun. 22, 2021, which are herein incorporated by reference in their entirety for all purposes.

BACKGROUND

Access tokens can be used to obtain specific resources such as access to secure locations, secure data, as well as goods and services. Tokens can be associated with underlying credentials. For example, an access token may be data that is a substitute for a real credential such as a driver's license ID number, an employee ID number, or payment account number.

Sometimes, token requests are received with specific actions that are to be performed with the tokens that are to be issued. For example, a first user using a first user device may initiate a request to provision a token to a second user device operated by a second user. The first user may wish to place restrictions on the use of the access token by the second user. For example, the first user may be a parent, and the second user may be a child of the parent. The parent may wish to place certain restrictions on how the child can use the access token.

Certain problems can occur in the above situation and other situations when the token computers that provide tokens are not fully integrated with data processing computers that may eventually use the tokens to provide users with access to resources. In such situations, the token computers do not have an effective way to provide the data regarding the restrictions to the data processing computers, and the restrictions desired by the token requestors cannot be applied in future interactions that are processed by the data processing computers.

Embodiments of the invention address these and other problems, individually and collectively.

BRIEF SUMMARY

One embodiment includes a method comprising: receiving, by token computer, a token request message comprising a real credential or a reference to the real credential, a unique value, and action data from a token requestor; obtaining, by the token computer, a token; transmitting, by the token computer the token to the token requestor; and providing, by the token computer, the unique value and the action data to a data matching computer, which stores the unique value and the action data, and subsequently receives a message from a data processing computer comprising the unique value, determines that the received unique value matches the stored unique value, and provides the action data to the data processing computer or performs an action with respect to the action data.

Another embodiment of the invention includes a system comprising: a token computer comprising a processor, and a non-transitory computer readable medium, the non-transitory computer readable medium comprising code, executable by the processor, for performing operations comprising: receiving a token request message comprising a real credential or a reference to the real credential from a token requestor, a unique value, and action data; obtaining a token; transmitting the token to the token requestor; and providing the unique value and the action data to a data matching computer, which stores the unique value and the action data, and subsequently receives a message from a data processing computer comprising the unique value, determines that the received unique value matches the stored unique value, and provides the action data to the data processing computer or performs an action with respect to the action data.

Another embodiment of the invention includes a method comprising: method comprising: receiving, by a data matching computer from a token computer, a unique value and action data associated with a token request message; storing, by the data matching computer, the unique value and the action data; receiving, by the data matching computer, a message from a data processing computer comprising the unique value; determining, by the data matching computer, that the received unique value matches the stored unique value; and providing the action data to the data processing computer or performing an action with respect to the action data These and other embodiments are described in further detail below.

DETAILED DESCRIPTION

Before discussing specific embodiments of the invention, some descriptions of some terms may be helpful.

A "user" may include an individual. In some embodiments, a user may be associated with one or more personal accounts and/or mobile devices. The user may also be referred to as a cardholder, account holder, or consumer in some embodiments.

A "user device" may be any suitable device that can interact with a user device (e.g., a payment card or mobile phone). User devices may be in any suitable form. Some examples of user devices include cellular phones, PDAs, personal computers (PCs), tablet computers, and the like. In some embodiments, where a user device is a mobile device, the mobile device may include a display, a memory, a processor, a computer-readable medium, and any other suitable component.

A "mobile device" (sometimes referred to as a mobile communication device) may comprise any suitable electronic device that may be transported and operated by a user, which may also provide remote communication capabilities to a network. A mobile communication device may communicate using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet or a private network. Examples of mobile devices include mobile phones (e.g. cellular phones), PDAs, tablet computers, net books, laptop computers, wearable devices (e.g., watches), vehicles such as automobiles and motorcycles, personal music players, handheld specialized readers, etc. A mobile device may comprise any suitable hardware and software for performing such functions, and may also include multiple devices or components (e.g. when a device has remote access to a network by tethering to another device—i.e. using the other device as a modem—both devices taken together may be considered a single mobile device).

A "payment device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A payment device may be associated with a value such as a monetary value, a discount, or store credit, and a payment device may be associated with an entity such as a bank, a merchant, a processing network, or a person. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. Other examples of payment devices include payment cards, smart media, transponders, and the like. If the payment device is in the form of a debit, credit, or smartcard, the payment device may also optionally have features such as magnetic stripes. Such devices can operate in either a contact or contactless mode.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, and verification values such as CVV, dCVV, CVV2, dCVV2, and CVC3 values.

A "digital wallet" can include an electronic device that allows an individual to conduct electronic commerce transactions. A digital wallet may store user profile information, payment credentials, bank account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A digital wallet may be designed to streamline the purchase and payment process. A digital wallet may allow the user to load one or more payment cards onto the digital wallet so as to make a payment without having to enter an account number or present a physical card.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a payment token may include a series of alphanumeric characters that may be used as a substitute for an original account identifier. For example, a token "4900 0000 0000 0001" may be used in place of a PAN "4147 0900 0000 1234." In some embodiments, a payment token may be "format preserving" and may have a numeric format that conforms to the account identifiers used in existing transaction processing networks (e.g., ISO 8583 financial transaction message format). In some embodiments, a payment token may be used in place of a PAN to initiate, authorize, settle or resolve a payment transaction or represent the original credential in other systems where the original credential would typically be provided. In some embodiments, a payment token may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other information that may be replaced with a substitute value (i.e., token). Tokenization enhances transaction efficiency and security.

A "token issuer," "token provider" or "token service system" can include a system that services tokens. In some embodiments, a token service system can facilitate requesting, determining (e.g., generating) and/or issuing tokens, as well as maintaining an established mapping of tokens to primary account numbers (PANs) in a repository (e.g. token vault). In some embodiments, the token service system may establish a token assurance level for a given token to indicate the confidence level of the token to PAN binding. The token service system may include or be in communication with a token vault where the generated tokens are stored. The token service system may support token processing of payment transactions submitted using tokens by de-tokenizing the tokens to obtain the actual PANs. In some embodiments, a token service system may include a tokenization computer alone, or in combination with other computers such as a transaction processing network computer. Various entities of a tokenization ecosystem may assume the roles of the token service provider. For example, payment networks and issuers or their agents may become the token service provider by implementing the token services according to embodiments of the present invention.

A "token domain" may indicate an area and/or circumstance in which a token can be used. Examples of token domains may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters (i.e. token domain restriction controls) may be established as part of token issuance by the token service provider that may allow for enforcing appropriate usage of the token in payment transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction. In some embodiments, a token domain can be associated with a token requestor.

A "token expiry date" may refer to the expiration date/time of the token. The token expiry date may be passed among the entities of the tokenization ecosystem during transaction processing to ensure interoperability. The token expiration date may be a numeric value (e.g. a 4-digit numeric value). In some embodiments, the token expiry date can be expressed as a time duration as measured from the time of issuance.

A "token request message" may be an electronic message for requesting a token. A token request message may include information usable for identifying a payment account or digital wallet, and/or information for generating a payment token. For example, a token request message may include payment credentials, mobile device identification information (e.g. a phone number or MSISDN), a digital wallet identifier, information identifying a tokenization service provider, a merchant identifier, a cryptogram, and/or any other suitable information. Information included in a token request message can be encrypted (e.g., with an issuer-specific key). The token request message may also include action data.

A "token response message" may be a message that responds to a token request. A token response message may include an indication that a token request was approved or denied. A token response message may also include a payment token, mobile device identification information (e.g. a phone number or MSISDN), a digital wallet identifier, information identifying a tokenization service provider, a merchant identifier, a cryptogram, and/or any other suitable information. Information included in a token response message can be encrypted (e.g., with an issuer-specific key).

A "token requestor" may be an application, a device, or a system that is configured to perform actions associated with tokens. For example, a token requestor can request registration with a network token system, request token generation, token activation. token de-activation, token exchange, other token life-cycle management related processes, and/or any other token related processes. A token requestor may interface with a network token system through any suitable communication networks and/or protocols (e.g., using HTTPS, simple object access protocol (SOAP) and/or an extensible markup language (XML) interface). Some non-limiting examples of a requestor may include users, user devices, third party wallet providers, issuers, acquirers, merchants, and/or processing networks. A requestor may be referred to as a token requestor when requesting generation of a new token or requesting a new use of an existing token from a network token system. In some embodiments, a token requestor can request tokens for multiple domains and/or channels. Token requestors may include, for example, card-on-file merchants, acquirers, acquirer processors, and payment gateways acting on behalf of merchants, payment enables (e.g., original equipment manufacturers, mobile network operators, etc.), digital wallet providers, and/or card issuers.

A "token requestor identifier" may include any characters, numerals, or other identifiers associated with an entity associated with a network token system. For example, a token requestor identifier may be associated with an entity that is registered with the network token system. In some embodiments, a unique token requestor identifier may be assigned for each domain for a token request associated with the same token requestor. For example, a token requestor identifier can identify a pairing of a token requestor (e.g., a mobile device, a mobile wallet provider, etc.) with a token domain (e.g., e-commerce, contactless, etc.). A token requestor identifier may include any format or type of information. For example, in one embodiment, the token requestor identifier may include a numerical value such as a ten digit or an eleven digit number (e.g., 4678012345).

A "resource provider" may be an entity that can provide a resource such as goods, services, information, and/or access. Examples of resource providers includes merchants, data providers, transit agencies, governmental entities, venue and dwelling operators, etc.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc.

An "issuer" may typically refer to a business entity (e.g., a bank) that maintains an account for a user. An issuer may also issue payment credentials stored on a user device, such as a cellular telephone, smart card, tablet, or laptop to the consumer.

An "access device" may be any suitable device that provides access to a remote system. An access device may also be used for communicating with a resource provider computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a mobile communication or payment device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization.

A "token presentment mode" may indicate a method through which a token is submitted for a transaction. Some non-limiting examples of the token presentment mode may include machine readable codes (e.g., QR™ code, bar code, etc.), mobile contactless modes (e.g., near-field communication (NFC) communication), e-commerce remote modes, e-commerce proximity modes, and any other suitable modes in which to submit a token.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

An "action" may include a process for doing something. Examples of actions may include storing data, applying controls to interaction request messages, manipulating data, etc.

"Action data" may include data pertaining to an action. For example, data pertaining to an action may include data or programming which causes a machine to perform a particular action. For instance, an example of action data can include control data for controlling interaction request messages. Control data may include rules which can be applied to data in interaction request messages. For instance, a rule may include declining an interaction that has a value greater than one thousand dollars.

A "unique value" can include a singular special value. An example of a unique value can be a nonce, which can be a random number. Unique values can have any suitable number and/or type of characters.

Embodiments of the invention can include efficient ways to effectively integrate additional actions associated with tokens or token requests when token computers and data processing computers are not directly and/or fully integrated with respect to one another.

When a token such as a payment token is push provisioned on a mobile device that can function as a payment device, an SDK on the mobile device often does not expose specific device information such as a device ID to external entities via the SDK. The lack of a unique device identifier limits an entity's ability to match a provisioning event or lifecycle event with a token creation event. This prohibits external entities from performing immediate actions, such as setting token specific controls, with respect to a provisioned token. Push provisioning tokens is descried in U.S. Pat. Nos. 10,248,952, 10,433,128, 10,911,456 and 10,959,093, which are herein incorporated by reference in their entirety.

Embodiments of the invention identify a parameter or unique value called a "nonce" that can be used to match a provisioned token with specific actions (e.g., payment controls with respect to the token) to be performed with respect to that token. The nonce can be a random value and can be used by external entities to push provision tokens to user devices such as mobile phones. This nonce can be used for matching a token to determined actions for that token. The nonce can be a nine digit alpha-numeric value that associates an external entity session with a token on mobile device. The nonce is also a required field in a request associated with an in-app (in application) provisioning API. Once the token has been provisioned, token lifecycle events are captured within a data feed (e.g., UMF feed) along with the nonce. Embodiments of the invention can track down the nonce in the data feed and match it with the nonce that was sent in the provisioning request along with actions to be performed (e.g., transaction controls). The actions to be performed can be returned to an external entity so that those actions can be performed with respect to the token.

One advantage of embodiments of the invention is that the nonce can be used to identify processing for a specific device. For example, a father may wish to push provision his payment token to his child's mobile phone. However, the feather may want to put transaction controls on the use of the token on his child's phone, but not his phone. Previously, there was no convenient way to do this, especially in the case where the father provides transaction control instructions at the time that push provisioning of the token to the daughter's phone is requested. Note that transaction controls are but one example of additional processing that can be place. Other processing that could take place could include fraud processing, security checks, rewards processing etc.

Figure 1:
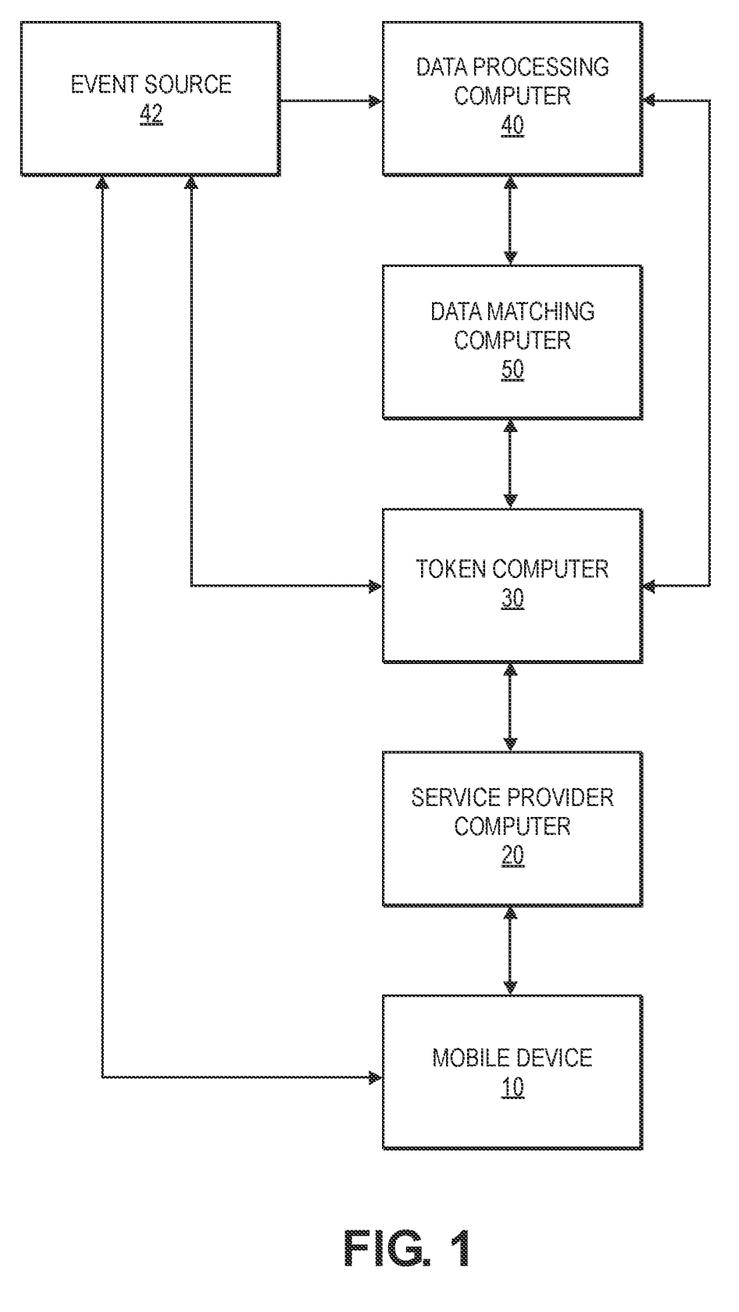
FIG. 1 shows a block diagram of a system according to embodiments of the invention.

FIG. 1 shows a system according to embodiment. The system includes a token computer 30 that can provision a token to a mobile device 10 at the request of a service provider computer 20. The system also includes a data processing computer 40 and a data matching computer 50 in communication with the token computer 30. An event source 42 can be in communication with the mobile device 10, the token computer 30, and the event source 42. More detailed descriptions of the token computer 30, the data matching computer 50, and the data processing computer 40 are provided below with respect to FIGS. 4, 5, and 6.

The service provider computer 20 may be a computer that can perform a service of some kind. Examples of service provider computers include a gateway server computer, a bank server computer, a digital wallet server computer, etc.

The token computer 30 can be a computer that generate, manages, and stores tokens and cryptograms, and any credentials that might be associated with those tokens and cryptograms. The token computer 30 can store mappings between tokens and real credentials.

The data processing computer 40 may be a computer that can process tokens or messages that contain tokens. In some embodiments, the data processing computer 40 can route messages including tokens, can apply rules to messages with tokens, provides additional services associated with tokens, approve or decline messages that contain tokens, etc. The data processing computer 40 can perform processing such as token controls, interaction authorizations, message routing, fraud checking, etc.

The event source 42 may initiate an interaction request with the data processing computer 40, in response to a communication initiated by the mobile device 10. The event source 42 could be, for example, a computer that grants access to a user to access secure data, a computer that grants access to a user to access a secure location, a computer such as a resource provider computer that initiates a payment transaction, a computer such as an acquirer computer that forwards an authorization request message from a resource provider computer, etc.

The event source 42 could also be a computer that notifies the data processing computer 40 that a token has been obtained for a particular device. This may then trigger the data processing computer 40 to request action data from the data matching computer 50 and store and/or apply the action data.

The mobile device 10 may be an example of a user device that is provisioned with a token that was obtained by (e.g., generated by) the token computer 30. User devices and mobile devices are described in detail above.

The data matching computer 50 may be a computer that matches action data to a token and optionally an associated credential, via a unique value such as a nonce. In some embodiments, the data matching computer 50 can receive information from the token computer 30 and can provide it to the data processing computer 40 after a matching process is performed and is successful.

The devices and computers illustrated in FIG. 1 can use any suitable communications network to communicate. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

Figure 2:
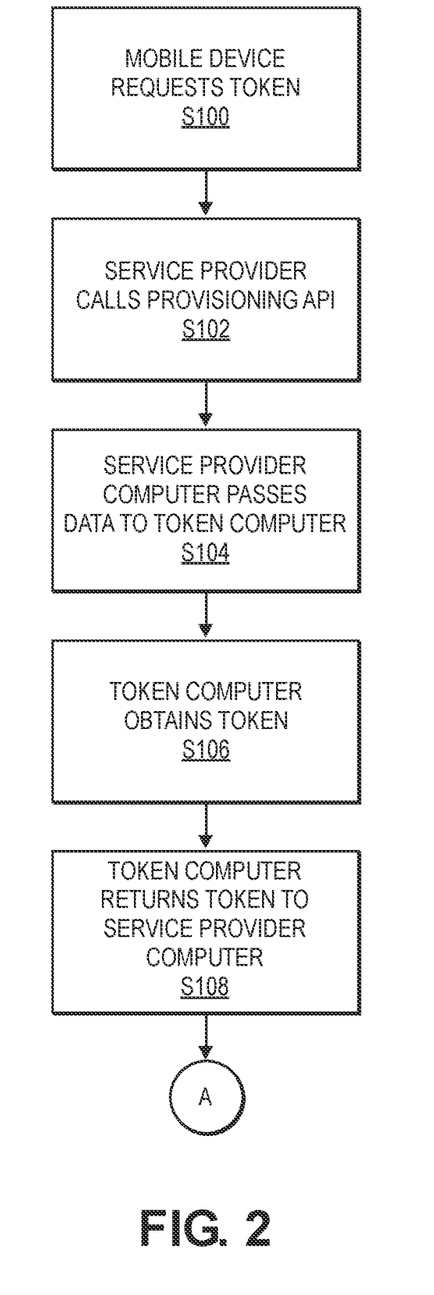
FIGS. 2-3 show aspects of methods according to embodiments of the invention.

A flowchart illustrating specific methods according to embodiments can be described with reference to FIG. 2, in conjunction with FIG. 1. The process can begin with a user that operates or is affiliated with the mobile device 10 expressing an interest in provisioning the mobile device with a token.

In step S100, the user may use the mobile device 10 to contact the service provider computer 20 to request a token. The request may also include certain action data. In some embodiments, the action data may include token control data (e.g., limit the use of the token on the mobile device 10 to one hundred dollars, limit the use of the token to access data or secure locations under particular circumstances, etc.).

In step S102, a service provider computer 20 can communicate with the token computer 30 after being contacted by the mobile device 10. In some embodiments, the service provider computer 20 can call an in application provisioning API to contact the token computer 30.

In step S104, the service provider computer 20 passes a data payload including the unique value and the action data to the token computer 30 in a token request message. For example, the service provider computer 20 can pass a data payload comprising wallet attributes and token finder criteria (e.g., a device certificate or "deviceCert," a unique value such as a nonce, and a signed unique value such as a nonce signature or "nonceSignature"), a credential or a reference to the real credential such as a card identifier (e.g., a payment account reference identifier or a virtual card ID), and action data in additional action fields (e.g., transaction controls for a token in an additional action field) to the token computer 30 in a token request message.

In step S108, the service provider computer 20 can communicate with the token computer 30 to obtain a token using the data payload. The token computer 30 receives the token request message comprising a real credential or a reference to the real credential, a unique value, and action data.

In step S106, the token computer 30 then obtains a token, and then returns an encrypted data payload (including the token) to the service provider computer 20. The token computer 30 can obtain the token by generating the token or retrieving the token from a pool of available tokens.

After receiving the encrypted data payload, the service provider computer 20 may obtain the token and may provide the token to the mobile device 10 or may store it on behalf of the mobile device 10.

In step S110, the token computer 30 determines if the request includes additional action fields that trigger a need for token matching. If the request does include such additional action fields, various data are provided to the data matching computer 50. For example, if the token request message includes additional action fields that include action data such as control data, then that data is provided to the data matching computer 50 for storage. Wallet attributes and token finder criteria including the deviceCert, nonce, and nonceSignature are then provided to a data matching computer 50 which stores this data, along with the action data in the additional action fields (e.g., transaction controls for transactions) in step S112. The action data may be used to process subsequent interactions such as subsequent authorization request messages.

Figure 3:
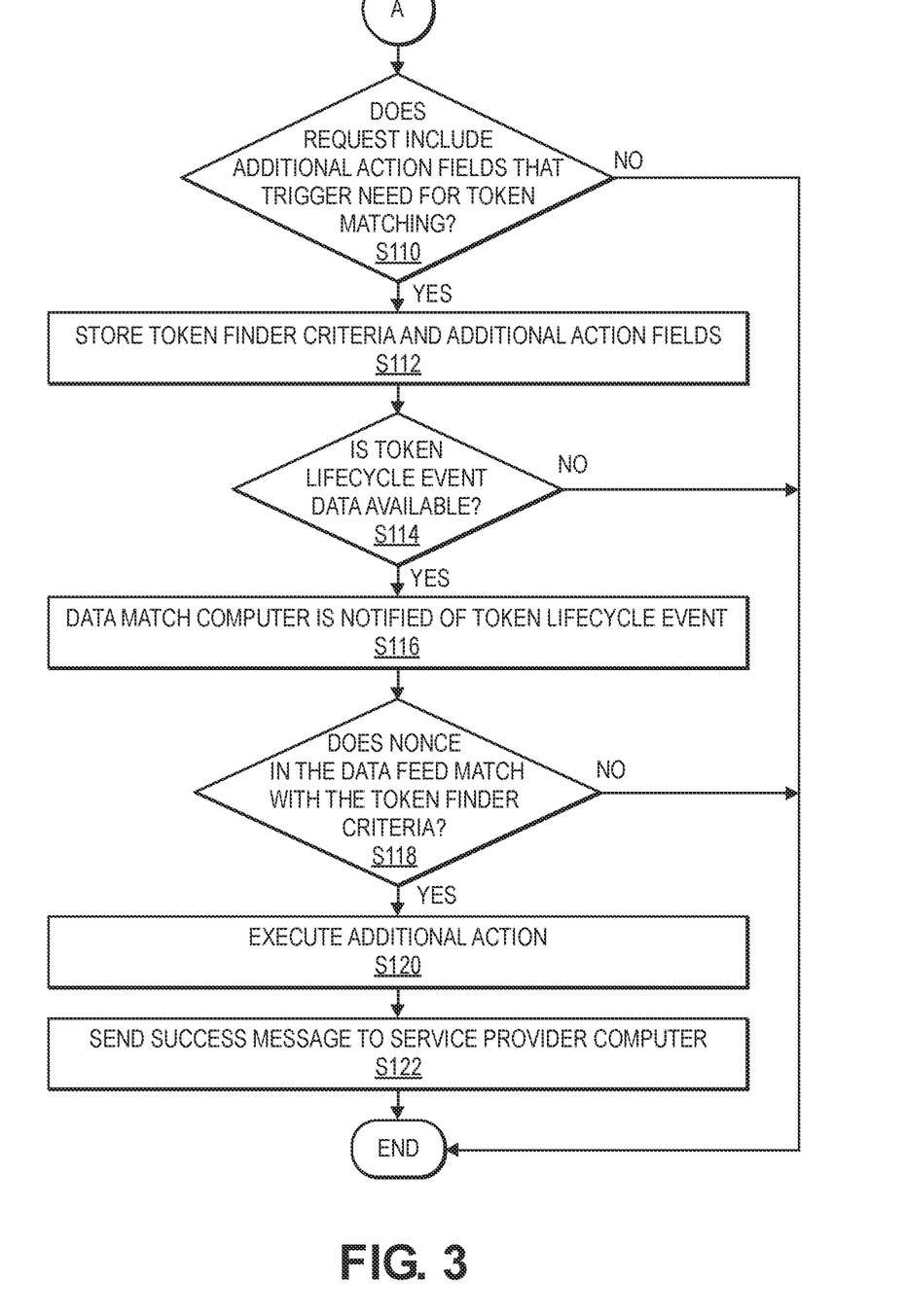

At step S114, the data matching computer 50 may receive requests from one or more data processing computers such as data processing computer 40 or may monitor a data feed from the data processing computer 40. The requests may be in response to a communication from the event source 42, which may have communicated with the mobile device 10 in an event. In some embodiments, the event source 42 may have been notified of the creation of the token by the token computer 30. This may cause the event source 42 to communicate with the data processing computer 40. A determination is then made by the data processing computer 40 as to whether there is a token lifecycle event that is available. An example of a token lifecycle event may be a request to register the newly created token with a transaction control service.

The data matching computer 50 is then notified of the token lifecycle event. The notification can include information such as a token reference ID, a token, a primary account number reference identifier, a wallet account identifier, a device identifier, a token reference identifier, a wallet account identifier, a device name, a wallet provider operating system type, a device ID type, a nonce, a nonce signature, a token creation timestamp, a token status, a token value, and a primary account number. These notifications can be periodically sent by the event source 42 or data processing computer 40 to the data matching computer 40 as they are received from the token computer 30 or other computers.

At step S118, a determination is made by the data matching computer 50 as to whether the nonce matches the previously stored nonce (or other unique value). The data matching computer 50 may also receive a signed unique value such as a signed nonce. The signed unique value can be verified using a public key associated with the private key that was used to sign the unique value. If the nonce matches and the nonce signature is verified, then at step S120, the data in the action data in the action fields is retrieved from storage, and it is either provided to the data processing computer 40 or it can be executed. For example, if the action data are transaction controls, then the transaction control data received in the original provisioning request is forwarded to the data processing computer 40. If the data matching computer 50 is integrated with the data processing computer 40, then it may also execute the action data without passing it to the data processing computer 40.

If the action data is used by the data processing computer 40, the data processing computer 40 may then use the action data to perform processing on transactions involving tokens. For example, if the action data relates to limiting the amount of spend on a token to $100, then a rule that states that transactions over $100 using the provisioned token that is associated with the matching nonce will be stored in the database of the data processing computer 40. When the data processing computer 40 receives an interaction request such as an authorization request message comprising the token and a transaction amount over $100, then the data processing computer 40 will check to see the database to if the transaction should be declined based upon the rule. In another example, the action data can relate to limiting the type of data or location that a user can access. When the data processing computer 40 receives an interaction request that requests access to a certain type of secure data, or access to a certain location, the data processing computer 40 can determine if there are any restrictions associated with that request. The data processing computer 40 can then approve or deny the request based upon the stored action data. In yet other embodiments, the action data can be used to process, transform, or re-route data in an interaction request.

At step S122, after an interaction request has been processed using the action data, a success message can then be sent to the service provider computer 20.

Figure 4:
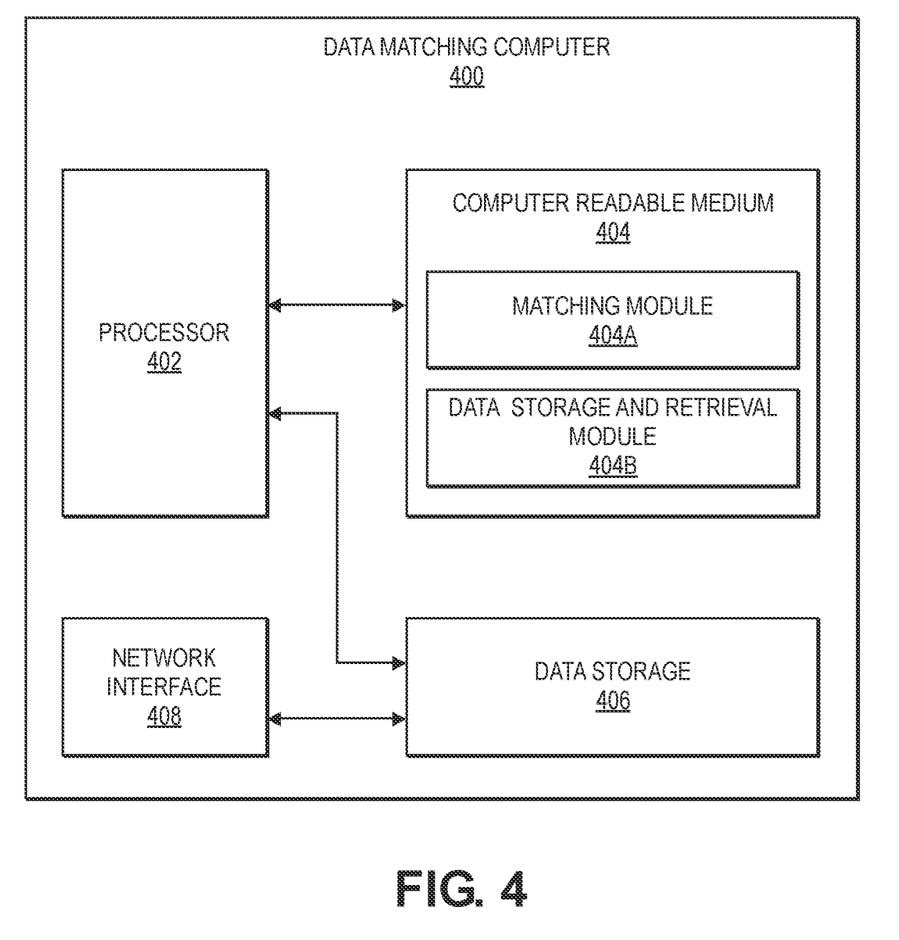
FIG. 4 shows a block diagram of an exemplary data matching computer according to an embodiment.

FIG. 4 shows a block diagram showing components in an exemplary data matching computer 400 according to an embodiment. The data matching computer 400 may comprise a processor 402. It may also comprise a computer readable medium 404, a data storage 406, and a network interface 408 operationally coupled to the processor 402.

The computer readable medium 404 may store code or instructions for allowing data matching computer 400 to operate in the manner described herein. The instructions may be executed by the processor 402. For example, the computer readable medium 404 may comprise code or instructions for: receiving, by a data matching computer from a token computer, a unique value and action data associated with a token request message; storing, by the data matching computer, the unique value and the action data; receiving, by the data matching computer, a message from a data processing computer comprising the unique value; determining, by the data matching computer, that the received unique value matches the stored unique value; and providing the action data to the data processing computer or performing an action with respect to the action data.

The computer readable medium 404 may further comprise a matching module 404A and a data storage and retrieval module 404B. The matching module 404A may comprise software which will allow the data matching computer 400 receive a communication comprising token finder data such as a unique value (e.g., a nonce) and/or a signed unique value from a data processing computer and determine if it matches a corresponding unique value and/or signed unique value in the data storage 406. The data storage and retrieval module 404B may comprise software which will allow the data matching computer 400 to storage data such as the unique values and/or signed unique values in the data storage 406 along with any action data received in the token request messages and corresponding tokens and/or credentials thereof.

Figure 5:
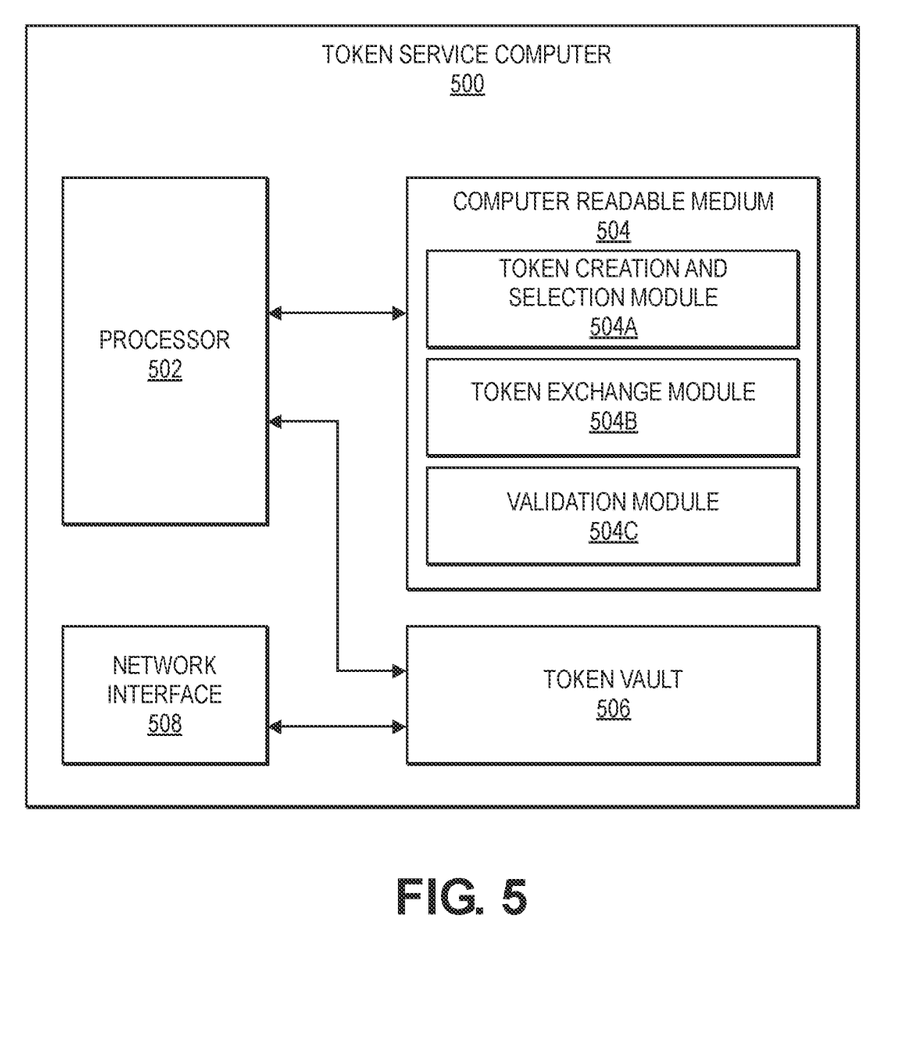
FIG. 5 shows a block diagram of an exemplary token computer according to an embodiment.

FIG. 5 shows a token computer 500. The token computer 500 includes a processor 502 and a computer readable medium 504, a token vault 506, and a network interface 508 coupled to the processor 502.

The token vault 506 may store tokens and their associated credentials in a database. The token vault 506 may store data in a database such as an Oracle™ database.

The computer readable medium 504 may comprise code, executable by the processor 502 to perform a method comprising: the non-transitory computer readable medium comprising code, executable by the processor, for performing operations comprising: receiving a token request message comprising a real credential or a reference to the real credential, unique value, and action data from a token requestor; obtaining a token; transmitting the token to the token requestor; and providing the unique value and the action data to a data matching computer, which stores the unique value and the action data, and subsequently receives a message from a data processing computer comprising the unique value, determines that the received unique value matches the stored unique value, and provides the action data to the data processing computer or performs an action with respect to the action data.

The computer readable medium 504 may comprise a token creation and selection module 504A, a token exchange module 504B and a validation module 504C.

The token creation and selection module 504A may comprise code that causes the processor 502 to either create tokens or select tokens from pools of tokens in response to token requests.

The tokenization exchange module 504B may comprise code that causes the processor 502 to provide access tokens. For example, the token exchange module 504B may contain logic that causes the processor 502 to generate a payment token and/or associate the payment token with a set of payment credentials. A token record may then be stored in a token record database indicating that the payment token is associated with a certain user or a certain set of payment credentials.

The validation module 504C may comprise code that causes the processor 502 to validate token requests before a payment token is provided. For example, validation module 504C may contain logic that causes the processor 502 to confirm that a token request message is authentic by decrypting a cryptogram included in the message, by confirming that the payment credentials are authentic and associated with the requesting device, by assessing risk associated with the requesting device.

Figure 6:
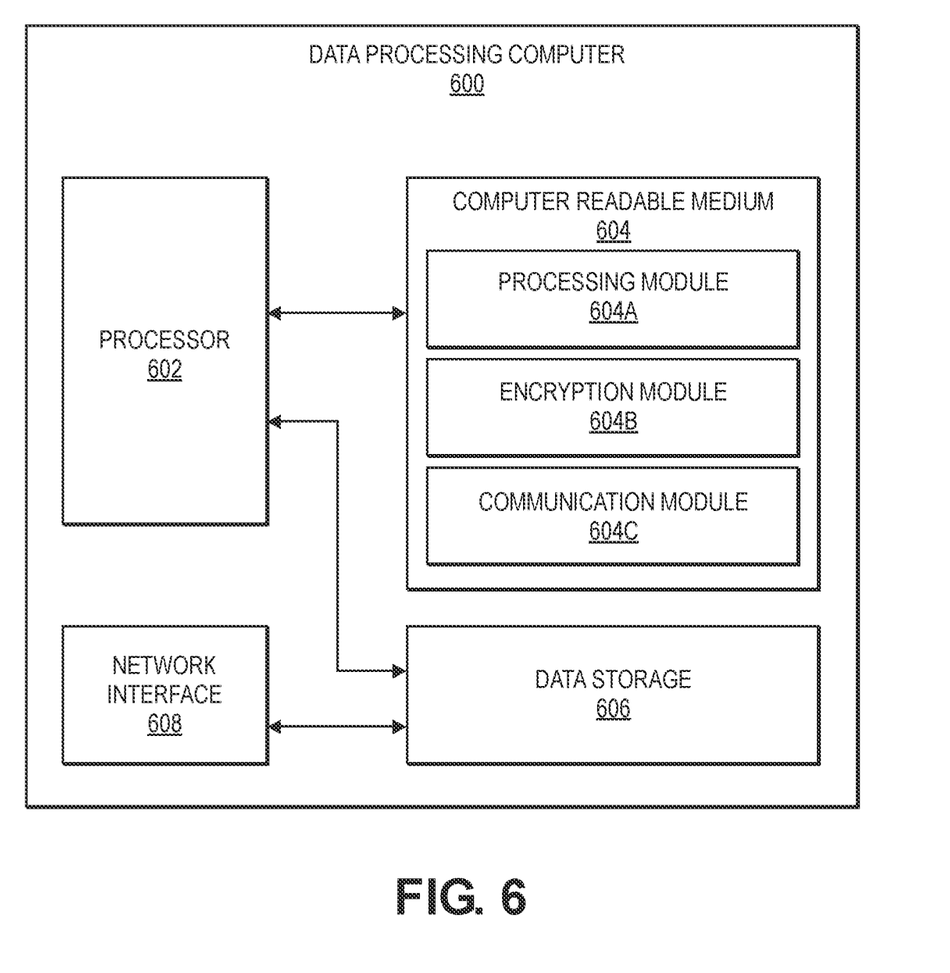
FIG. 6 shows a block diagram of an exemplary data processing computer according to an embodiment.

FIG. 6 shows a block diagram of a data processing computer 600 according to an embodiment. The data processing computer 600 may comprise a processor 602, which may be coupled to a computer readable medium 604, data storage 606, and a network interface 608. The data storage 606 may contain action data, access data such as tokens and/or account data, as well as mappings between access data, credentials, and/or communication device identifiers such as phone numbers, IP addresses, device identifiers, etc.

The computer readable medium 604 may comprise a number of software modules including a processing module 604A, an encryption/decryption module 604B, and a communication module 604C. The computer readable medium may also comprise a clearing and settlement module (not shown).

The processing module 604A may comprise code that can cause the processor 602 to evaluate interaction request messages and process them. The processing of the interaction request messages can involve the previously described action data. In some embodiments, the processing module 604A can be used for transactions and can be used to determine if the transactions should be authorized. The processing module 604A may also include code for routing or modifying authorization request and response messages as they pass between various parties such as authorizing entity computers (e.g., issuer computers) and transport computers (e.g., acquirer computers). The processing module 604A may also use the action data described above to process data in any interaction requests.

The encryption/decryption module 604B may include any suitable encryption/decryption algorithms to encrypt data in embodiments of the invention. Suitable data encryption/decryption algorithms may include DES, triple DES, AES, etc. It may also store encryption keys that can be used with such encryption/decryption algorithms. The encryption/decryption module 604B may utilize symmetric or asymmetric encryption techniques to encrypt and/or verify data. Cryptographic keys that may be used by the encryption/decryption module 604B may be securely stored in the data storage 606.

The communication module 604C may comprise code that causes the processor 602 to generate messages, forward messages, reformat messages, and/or otherwise communicate with other entities.

Figure 7:
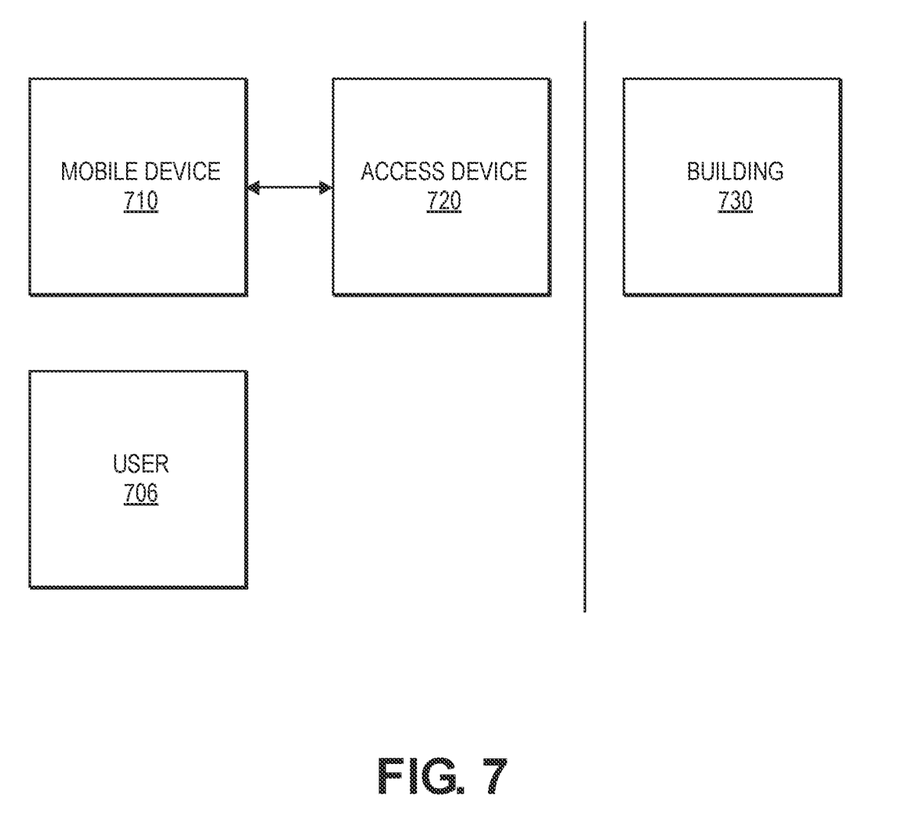
FIG. 7 shows a block diagram of a system for allowing a user to perform an interaction such as accessing a secure location such as a building.

FIG. 7 shows a block diagram of a building access system. FIG. 7 shows a mobile device 710 operated by a user 706. The mobile device 710 has been provisioned with access data as described above. The mobile device 710 can interact with the access device 720 and pass access data to the access device 720. The access device 720 may locally verify the received access data or it may communicate with a remotely located authentication server computer (not shown). The remotely located authentication server computer be an example of the above-described data processing computer and may verify that the access data is authentic, may apply any action data to the access request, and may transmit a signal indicating this back to the access device 720. The access device 720 may then proceed to let the user 706 enter the building 730.

Figure 8:
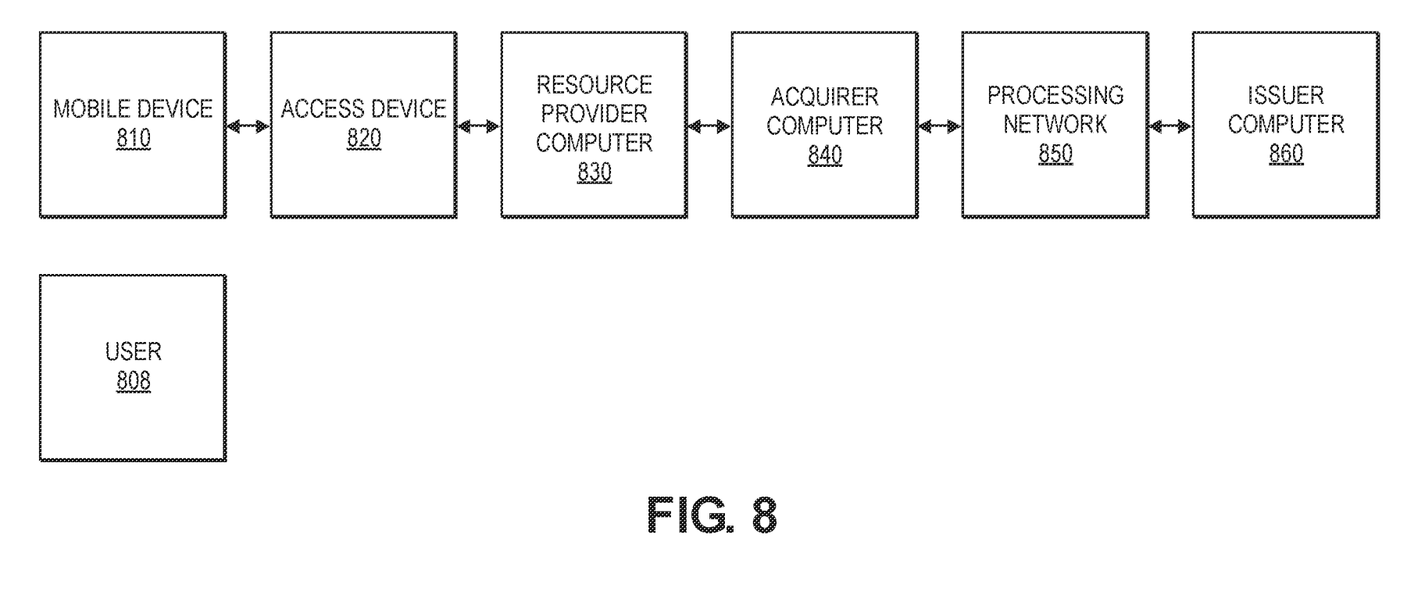
FIG. 8 shows a block diagram of a system for conducting an interaction such as a payment transaction.

FIG. 8 shows a block diagram of a transaction processing system that can use a mobile device with access data. FIG. 8 shows a user 806 that can operate a mobile device 810. The user 806 may use the mobile device 810 to pay for a good or service at a resource provider such as a merchant. The merchant may operate a resource provider computer 830 and/or an access device 820. The merchant may communicate with an issuer computer 860 via an acquirer computer 840 and a processing network 850. The processing network 850 can be an example of the data processing computer 40 described above.

The processing network 850 may be a payment processing network and can include data processing subsystems, networks, and operations used to support and deliver authorization services, exception file services, and clearing and settlement services. An exemplary payment processing network may include VisaNet™. Payment processing networks such as VisaNet™ can process credit card transactions, debit card transactions, and other types of commercial transactions. VisaNet™ includes a VIP system (Visa Integrated Payments system) which processes authorization requests and a Base II system which performs clearing and settlement services. The payment processing network may use any suitable wired or wireless network, including the Internet.

A typical payment transaction flow using a mobile device 810 at an access device 820 (e.g., POS location) can be described as follows. A user 806 presents his or her mobile device 810 to an access device 820 to pay for an item or service. The mobile device 810 and the access device 820 interact such that access data from the mobile device 810 (e.g., PAN, a payment token, verification value(s), expiration date, etc.) is received by the access device 820 (e.g., via contact or contactless interface). The resource provider computer 830 may then receive this information from the access device 820 via an external communication interface. The resource provider computer 830 may then generate an authorization request message that includes the information received from the access device 820 (e.g., information corresponding to the mobile device 810) along with additional transaction information (e.g., a transaction amount, merchant specific information, etc.) and electronically transmits this information to an acquirer computer 840. The acquirer computer 840 may then receive, process, and forward the authorization request message to a processing network 850 for authorization.

In general, prior to the occurrence of a credit or debit-card transaction, the processing network 850 has an established protocol with each issuer on how the issuer's transactions are to be authorized. In some cases, such as when the transaction amount is below a threshold value, the processing network 850 may be configured to authorize the transaction based on information that it has about the user's account without generating and transmitting an authorization request message to the issuer computer 860. In other cases, such as when the transaction amount is above a threshold value, the processing network 850 may receive the authorization request message, determine the issuer associated with the mobile device 810, and forward the authorization request message for the transaction to the issuer computer 860 for verification and authorization. Once the transaction is authorized, the issuer computer 860 may generate an authorization response message (that may include an authorization code indicating the transaction is approved or declined) and transmit this electronic message via its external communication interface to processing network 850. The processing network 850 may then forward the authorization response message to the acquirer computer 840, which in turn may then transmit the electronic message to comprising the authorization indication to the resource provider computer 830, and then to the access device 820.

If the authorization request message includes a token, then the processing network 850 may exchange the token for a real credential such as a credit or debit card number and may modify the authorization request message to include the real credential and may forward the modified authorization request message to the issuer computer 860 for authorization. The processing network 850 may apply any applicable action data (e.g., controls) to the authorization request message before sending the authorization request message to the issuer computer. For example, if the action data is a control that indicates that transactions above one hundred dollars is not allowed for the token in the authorization request message, then the processing network 850 can send an authorization response message back to the access device 820 without notifying the issuer computer 860. If the authorization request message is sent to the issuer computer 860, then the issuer computer 860 may then reply with the authorization response message including the real credential, and the processing network can then replace the real credential with the token before forwarding the authorization response message back to the access device 820.

At the end of the day or at some other suitable time interval, a clearing and settlement process between the resource provider computer 830, the acquirer computer 840, the processing network 850, and the issuer computer 860 may be performed on the transaction.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, by token computer, a token request message comprising a real credential or a reference to the real credential, a unique value, and action data from a token requestor;
   obtaining, by the token computer, a token;
   transmitting, by the token computer, the token to the token requestor; and
   providing, by the token computer, the unique value and the action data to a data matching computer, which stores the unique value and the action data, and subsequently receives a message from a data processing computer comprising the unique value, determines that the received unique value matches the stored unique value, and provides the action data to the data processing computer or performs an action with respect to the action data.

2. The method of claim 1, wherein the action data comprises control data.

3. The method of claim 1, wherein the action data comprises control data, the control data controlling interactions performed with respect to the token.

4. The method of claim 1, wherein the token requestor is a user device.

5. The method of claim 1, wherein the token requestor is a service provider computer, which interacts with a user device, which the user device requests the token via the service provider computer.

6. The method of claim 1, wherein the data matching computer provides the action data to the data processing computer, which stores the action data and uses the action data to process further subsequent interactions.

7. The method of claim 1, wherein the token requestor is a user device, and wherein the data matching computer provides the action data to the data processing computer, which stores the action data and uses the action data to process further subsequent interactions.

8. The method of claim 1, wherein the token is a substitute for the real credential.

9. The method of claim 1, wherein the unique value is a nonce.

10. The method of claim 9, wherein the token request message also comprises a signed nonce.

11. The method of claim 10, wherein the data matching computer provides the signed nonce along to the data processing computer along with the nonce.

12. The method of claim 11, wherein the nonce is a random value.

13. The method of claim 1, wherein the unique value is a nonce, which is a random value.

14. The method of claim 1, wherein the data matching computer provides the action data to the data processing computer, which stores the action data and uses the action data to process further subsequent interactions, the action data comprising control data, and the subsequent interactions being authorized or declined based on the control data.

15. A system comprising:
a token computer comprising a processor, and a non-transitory computer readable medium, the non-transitory computer readable medium comprising code, executable by the processor, for performing operations comprising:
receiving a token request message comprising a real credential or a reference to the real credential, a unique value, and action data from a token requestor;
obtaining a token;
transmitting the token to the token requestor; and
providing the unique value and the action data to a data matching computer, which stores the unique value and the action data, and subsequently receives a message from a data processing computer comprising the unique value, determines that the received unique value matches the stored unique value, and provides the action data to the data processing computer or performs an action with respect to the action data.

16. A method comprising:
receiving, by a data matching computer from a token computer, a unique value and action data associated with a token request message;
storing, by the data matching computer, the unique value and the action data;
receiving, by the data matching computer, a message from a data processing computer comprising the unique value;
determining, by the data matching computer, that the received unique value matches the stored unique value; and
providing the action data to the data processing computer or performing an action with respect to the action data.

17. The method of claim 16, wherein the unique value is a nonce.

18. The method of claim 17, wherein the data matching computer also receives a signed nonce along with the nonce and stores the signed nonce along with the nonce, the signed nonce being the nonce signed with a private key of a token requestor provided the token request message to the token computer.

19. The method of claim 18, wherein the data matching computer receives the signed nonce along with the nonce from the data processing computer.

20. The method of claim 18, wherein the data matching computer verifies the signed nonce using a public key associated with the private key.

* * * * *